United States Patent [19]

Szenes et al.

[11] Patent Number: 4,675,842

[45] Date of Patent: Jun. 23, 1987

[54] APPARATUS FOR THE DISPLAY AND STORAGE OF TELEVISION PICTURE INFORMATION BY USING A MEMORY ACCESSIBLE FROM A COMPUTER

[75] Inventors: Zsursa Szenes; Béla Endrödi, both of Budapest, Hungary

[73] Assignee: Szamitastechnikai Koordinacios Intezet, Budapest, Hungary

[21] Appl. No.: 669,040

[22] PCT Filed: May 7, 1981

[86] PCT No.: PCT/HU81/00022

§ 371 Date: Dec. 22, 1981

§ 102(e) Date: Dec. 22, 1981

[87] PCT Pub. No.: WO81/03234

PCT Pub. Date: Nov. 12, 1981

Related U.S. Application Data

[63] Continuation of Ser. No. 336,355, Dec. 22, 1981, abandoned.

[30] Foreign Application Priority Data

May 7, 1980 [HU] Hungary .............................. 1110/80

[51] Int. Cl.[4] ........................ G06F 15/66; G06F 3/153

[52] U.S. Cl. .................................... 364/900; 340/750; 340/814; 364/518

[58] Field of Search ... 364/200 MS File, 900 MS File, 364/518; 340/750, 814

[56] References Cited

U.S. PATENT DOCUMENTS

| | | | |
|---|---|---|---|
| Re. 31,200 | 4/1983 | Sukonick et al. | 340/724 |
| 4,104,624 | 8/1978 | Hamada | 340/750 |
| 4,117,470 | 9/1978 | Elliott | 340/750 |
| 4,125,873 | 11/1978 | Chesarek | 364/900 |
| 4,150,364 | 4/1979 | Baltzer | 340/750 X |
| 4,200,869 | 4/1980 | Murayama et al. | 340/750 X |
| 4,315,257 | 2/1982 | Hernandez | 340/723 |
| 4,326,202 | 4/1982 | Kidode et al. | 340/799 |

*Primary Examiner*—James D. Thomas
*Assistant Examiner*—David L. Clark
*Attorney, Agent, or Firm*—Toren, McGeady and Goldberg

[57] ABSTRACT

An apparatus for the display and storage of television picture information by using a dynamic random access memory accessible from a computer. The apparatus includes an interface providing connection to the computer, an address modifying circuit, an address switching unit including a first input group connected to predetermined address lines of the address bus of the address generator and a second group connected to predetermined address lines of the interface, and a parallel to series converter. The inputs of the address modifying circuit being coupled to the output of the address switching unit to provide modified addresses for the memory when any of the input groups addresses the memory. The control inputs of the address switching unit and of the data switching unit are connected to a horizontal address line of the address bus associated with a horizontal address bit ($X_3$) of low significance. The memory includes matrices whose rows are to be accessed by row addresses for reading or writing within a time period less than that required for refreshment. The picture addresses are allocated among the row and column addresses of the matrices in such a way that the row addresses ($X_4$, $X_5$, $X_6$, $X_7$, $Y_1$, $Y_2$, $Y_o$) occur in a shorter period than that required for the refreshment. The horizontal address bit ($X_3$) of low significance allocating one of two sets of the matrices to the address generator and to the display and allocating the other set to the interface of the computer for reading and writing. The access cycles of the two sets occurring substantially at the same time.

2 Claims, 7 Drawing Figures

APPARATUS FOR THE DISPLAY AND STORAGE OF TELEVISION PICTURE INFORMATION BY USING A MEMORY ACCESSIBLE FROM A COMPUTER

This is a continuation of application Ser. No. 336,355, filed Dec. 22, 1981, now abandoned.

TECHNICAL FIELD

The invention relates to an apparatus for the display and storage of television picture information by using a memory accessible from a computer.

The apparatus according to the invention can widely be used in the field of computer techniques in the form of a graphic display.

BACKGROUND OF THE PRIOR ART

The wide range of applications of graphic displays might be the result of the appropriate interconnections of television monitors and computers offered by recent technical progress. There are already a large number of computer controlled graphic displays which are commercially available.

A common feature of such displays lies in that they all have a central clock that controls an address generator to provide horizontal and vertical picture and memory addresses, and the address generator is coupled to a synchronizing unit. The connection towards the computer is established through an interface forming part of the display, and the computer has appropriate access periods in which it can communicate with the random access memory addressed by the address generator and controlled by a memory control unit. A digital to analog converter is coupled to the data bus of the memory and the output of the D/A converter provides the standard video signals required for a conventional standard black and white or color television monitor.

In the known apparatuses of the above kind, the computer access is provided during the line returning or picture returning periods.

Since the repetition period of the lines is 64 μs, the computer accesses established during line returning periods are limited in time.

If the computer has limited access time to the memory, the rate of information refreshment or the amount of information that can be read out from the memory in a unit time will be reduced.

For increasing the speed of operation the storage capacity can be increased which, however, is associated with high costs. A substantial part of the cost prices of such apparatuses is the price of the memory elements used therein, therefore the reduction of the number of memory elements is of high importance.

A virtual increase in memory demand in conventional display systems is created by the circumstance that the picture dissolution provided by the television technique can be covered generally by a redundant amount of storage capacity only due to ineffective memory allocation possibilities. This means that the storage capacity of the required number of memory elements is utilized in part only which is associated with decreased storage efficiency.

Of the various types of random access memories, the dynamic RAM memories are considered to be the most favourable when the storage capacity pro unit cost quotient is regarded. For the operation of such dynamic memories, it is required that within as short time periods as about 2 ms, all addresses of the memory should be accessed. With memory addresses corresponding to the vertical and horizontal scanning movement of the electron beam of the monitor, the above condition cannot be satisfied easily. The usage of certain kinds of address modification have already been proposed in connection with the application of random access memories, however, in such cases the modified addresses have been less easy to be handled and inspected than the horizontal and vertical addresses corresponding to the movement of the scanning electron beam which are visual and easy to work with.

OBJECT OF THE INVENTION

The object of the invention is to provide an apparatus for the display and storage of television picture information that comprises a memory accessible for a computer in which the efficiency of memory utilization is better than in conventional systems, the memory access time for the computer is substantially shorter than the duration of a television line, whereby the rate of information streaming to and from the computer is high i.e. the time of complete transcription of a picture is short, and which enables the usage of cost-saving dynamic RAM memories.

SUMMARY OF INVENTION

According to the invention, an apparatus has been provided for the display and storage of television picture information by using a memory accessible for a computer which comprises a central clock generator, an address generator providing horizontal and vertical picture addresses and coupled to the address generator, a synchron unit for generating line and picture synchron signals, an interface for providing connection towards the computer, a random access memory addressed by the address generator, a memory control unit, a digital to analog converter coupled to the data bus of the memory for providing video signals, in which the improvement lies in that the memory consists of dynamic random access memory elements having address inputs controlled through an address modifying circuit, the inputs of the address modifying circuit are coupled to the output of an address switching unit, the address switching unit comprises a first input group connected to predetermined address lines of the address bus of the address generator and a second input group connected to predetermined address lines of the interface, the data bus of the memory is connected to the input of a data switching unit comprising a first output group connected to parallel inputs of a prallel-to-series converter preferably a shift register and a second output group coupled to multiplex inputs of a multiplexer, the output of the multiplexer is connected to the data line of the interface, the control inputs of the address switching unit and of the data switching unit being connected to a horizontal address line of the address bus associated with a horizontal address bit of low significance, the parallel to series converter is controlled by the address lines carrying the least significant horizontal address bits, and the digital input of the digital to analog converter is connected to the serial output of the parallel-to-series converter.

In a preferable embodiment of the invention the data bus of the memory, the data switching unit, the parallel-to-series converter and the multiplexer as well as the buses interconnecting these units are designed to bidirectional data-transport and the series input of the parallel-to-serial converter is coupled to the digital output of an A/D converter.

It is preferable if the following conditions are true for the address modifying circuit: $X_8=X'_8$; $X_9=X'_9$; $Y_6=Y'_6$; $Y_7=Y'_7$ if $Y_9=0$ and $1=X'_8$; $1=X'_9$; $X_8=Y'_6$; $X_9=Y'_7$ if $Y_9=1$ wherein the addresses X and Y represent the states of the corresponding horizontal and vertical bit lines of the address bus, and the addresses X' and Y' designate the states of the modified horizontal and vertical addresses present at the output of the address modifying circuit. By using such modifications in the address system, the required storage capacity will be reduced to nearly a half value.

In accordance with the scanning with alternating half pictures it is preferable if each memory element of the memory is associated with a respective other memory element, and of the so obtained pairs of memory elements the first is validated by the condition $Y_o=1$ and the second by the condition $Y_o=0$.

The apparatus according to the invention satisfies the objects set forth hereinabove, since the memory is built up by dynamic RAM memory elements which are timely refreshed by the appropriate address allocation. The memory is available for the computer in the half of its operational time, whereby the rate of information reading and writing operations are both high, and the average access time for the computer to reach the memory is typically about 1 $\mu$s.

At the same time the storage capacity is effectively utilized due to the address modification carried out by the address modifying circuit.

BRIEF DESCRIPTION OF DRAWINGS

The invention will now be described in connection with certain preferable embodiments thereof, wherein reference will be made to the accompanying drawings. In the drawing.

DESCRIPTION OF THE PREFERRED EMBODIMENTS

Figure 1:
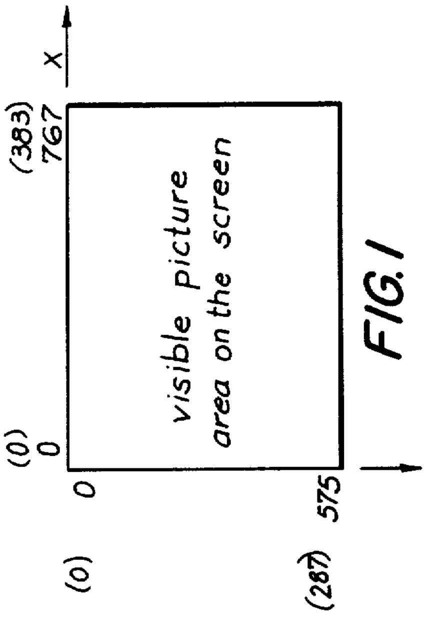
FIG. 1 shows schematically the screen of the monitor for illustrating the horizontal and vertical dissolution.

FIG. 1 shows the visible area of the screen of a television monitor. The problem to be solved lies in how this useful image area can be covered by an associated memory. If the standard 4:3 picture size is to be maintained with nearly identical horizontal and vertical dissolution, then the possibility offered by the application of television technique will be best used if respective memory contents are associated with each visible raster line i.e. if the vertical dissolution is equal to a raster line. During picture reversal the lines are not visible, therefore the number of visible raster lines is less than the complete number of raster lines in a picture. In case of using standard pictures with 625 lines, the efficiency of picture utilization will be fairly good if memory coverage is provided e.g. for 576 of the horizontal lines. Later it will be explained that the selection of that number is preferable also in view of several other aspects.

With fixed 4:3 proportion between the horizontal and vertical dimensions of the picture, the horizontal dissolution will be 768 which is equal to the maximum number of vertical lines that can be displayed on the screen. Indeed, with the selection of such number a proportion of 4:3 is provided, because the number of raster points in a line is: $768=12\times64$ and the number of raster points in a column is: $576=9\times64$.

If such a high dissolution is not required, then with substantially unchanged system design half as good dissolution can be obtained in both directions requiring a quarter storage capacity, in which the number of raster points in a line is: $384=12\times32$ and the number of raster points in a column is: $288=9\times32$.

In the following part of the description the invention will be described in connection with the higher dissolution. FIG. 1 shows that the 768 distinguishable horizontal states can be defined by ten binary addresses, and additional ten binary addresses are required for the definition of the 576 distinguishable vertical states. Indeed, nine addresses would not be sufficient for determining all of the vertical states, because nine binary addresses can define only as much as $2^9=512$ states which number is less than the required number 576. Each elementary point of the television monitor having a memory coverage is defined therefore by the values of ten horizontal and ten vertical addresses. Let $X_o$, $X_1$, . . . , $X_8$ and $X_9$ designate the horizontal and $Y_o$, $Y_1$, . . . , $Y_8$ and $Y_9$ designate the vertical addresses of respective elementary raster points, in which the less significant addresses being $X_o$ and $Y_o$ and the most significant ones being $X_9$ and $Y_9$.

FIG. 2 shows again the visible picture area divided now in horizontal direction 12 and in vertical direction 9 elementary regions. Each of such elementary regions has a square shape and comprises 64 raster points in both directions i.e. altogether $64^2$ points. It follows from the binary address system that within each of such elementary regions the respective raster points are defined by the least significant six bits of the horizontal and vertical addresses, i.e. by the horizontal addresses $X_o$, $X_1$, $X_2$, $X_3$, $X_4$ and $X_5$ and by the vertical address $Y_o$, $Y_1$, $Y_2$, $Y_3$, $Y_4$ and $Y_5$. The selection of the required one of the elementary regions is provided by the most significant four address bits.

Figure 2:
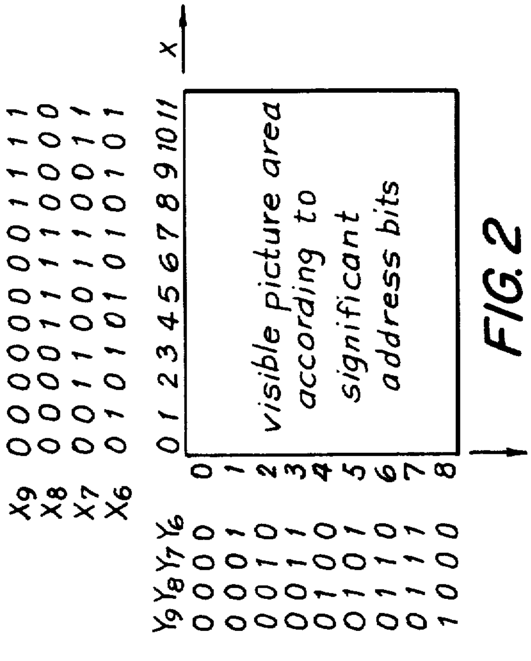
FIG. 2 is similar to FIG. 1 in which besides the vertical and horizontal margins of the picture area the most significant four address bits have also been indicated.

In FIG. 2 the visible picture area has been illustrated in such a way that numerical address values have been labelled at the upper and left margins to define the elementary regions and the numerical address values have been associated with the binary values of the corresponding most significant four horizontal address $X_6$, $X_7$, $X_8$ and $X_9$ and vertical addresses $Y_6$, $Y_7$, $Y_8$ and $Y_9$. If such binary addresses are read out as binary numbers, the values of such numbers are equal to the numerical coordinates of the corresponding elementary regions.

Figure 3:
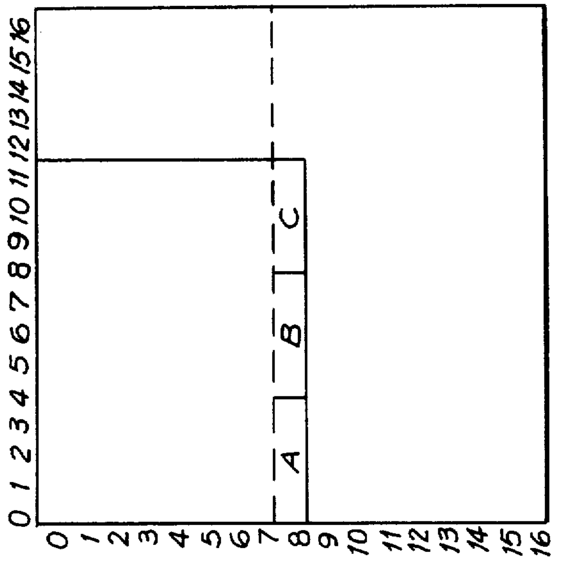
FIG. 3 shows schematically the memory required for covering the visible picture area.
Figure 4:
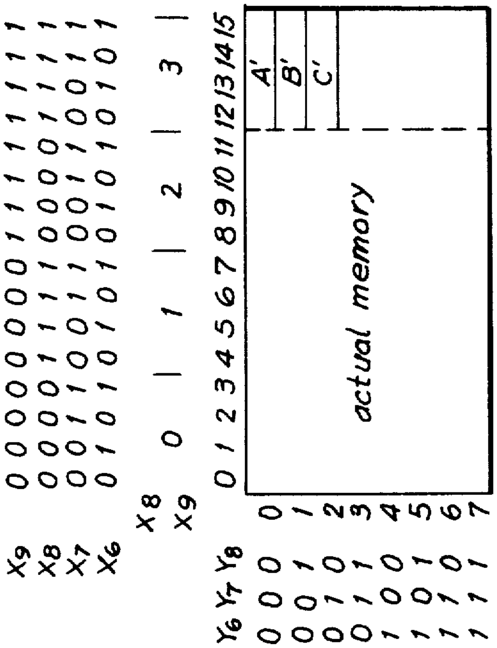
FIG. 4 is similar to FIG. 3 showing transformed memory regions.

In the knowledge of the above designations reference is made to FIGS. 3 and 4 illustrating the memory area required for the coverage of the visible picture area. FIG. 3 is similar to FIG. 2 and shows the elementary regions each consisting of $64\times64$ points and the numerical values of the elementary regions have also been indicated at the upper and left margins of the complete area. The numbers of the vertical numerical addresses have been preceded by the binary values of the associated most significant vertical address bit $Y_9$.

In view of the fact that existing memories have integer numbers of address ports it can be understood on the basis of FIG. 3 that with the memory coverage of a picture area with 4:3 size-ratio an ineffective memory utilization is obtained. Indeed, if the addressing of the elementary regions (each defining $64^2$ points) as units is considered, then respective four address bits are required in each directions and of the corresponding storage capacity defining $16\times 16$ of such unity regions only $9\times 12$ regions would comprise useful information.

In FIG. 3 the dashed line defines the half of the full storage capacity which can be addressed in the vertical direction by three bits instead of the required four bits. FIG. 4 shows such a memory area, can be addressed vertically by three bits and horizontally by four bits. Such a memory can be implemented with storage means having half capacity compared to that required for the coverage of the area shown in FIG. 3. It should be mentioned that the above referred three vertical bits represent actually the usage of nine vertical address bits, since the full address also comprises the six less significant address bits required for the addressing within the respective elementary regions.

When FIGS. 3 and 4 are compared, it can be seen that the lowest line of the elementary regions (i.e. the last 64 lines of the visible image) have been "left out" in FIG. 4. This last line of regions can be divided in three fields A, B and C each being associated with actual picture information requiring memory coverage. FIG. 4 shows that the fields A, B and C and be allocated in the first three lines of the last four horizontal regions. This will be clear if we understand that the horizontal address with its four bits can define sixteen horizontal regions, of which only twelve is required for the actual existing elementary regions. The remaining last four "blank" memory locations can well be used for the memory coverage of the fields A, B and C. FIG. 4 shows that with such allocation the last four locations of the last five memory lines are left empty. These empty but actually existing memory locations can be used for special purposes not forming part of the present invention.

Between the picture area shown in FIG. 2 and the actual memory capacity shown in FIG. 4 the correspondence can be provided by the application of modified addresses. A basic feature of the present invention lies in that the addressing of the elementary raster points occurs in accordance with the ten horizontal and ten vertical addresses shown in FIGS. 1 and 2 i.e. with altogether twenty addresses, and such addresses define the respective raster points when the apparatus is controlled by a computer coupled thereto. Such way of addressing is pictorial i.e. it can easily be visualized and the programs made by such addresses are not complicated can be checked easily. The actual addressing of the memory, however, occurs when the above mentioned visual addresses called also as picture addresses have been modified.

Figure 5:
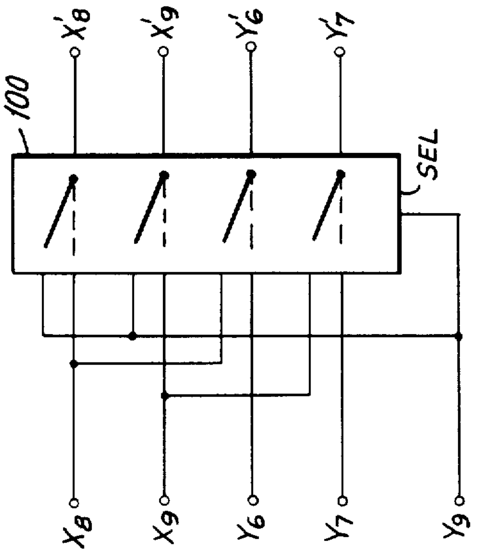
FIG. 5 shows the block diagram of the address modifying circuit implemented with a multiplexer.

The modification of the picture addresses is carried out by an address modifying circuit illustrated schematically in FIG. 5. The address modifying circuit can be implemented with a multiplexer 100 having eigth input and four output ports and comprising a selection control input SEL controlled by the vertical address bit $Y_9$. The eight inputs receive in the arrangement of FIG. 5 the horizontal address bits $X_8$ and $X_9$ and the vertical address bits $Y_6$, $Y_7$ and $Y_9$. The four output supplies modified horizontal addresses $X'_8$ and $X'_9$ and the modified vertical address bits $Y'_6$ and $Y'_7$.

The task of the address modifying circuit shown in FIG. 5 is to transform the elementary fields A, B and C in the memory fields shown in FIG. 4.

From the comparison of FIGS. 3 and 4 it can be seen that when the value of the vertical address bit $Y_9$ is 0, the picture scanning takes place in the upper eight lines of regions and no address modification is required.

When the value of the vertical address bit $Y_9$ will be "1", a modification is required. FIG. 4 shows that in the last four horizontal address regions (right hand side) of the memory the value of the first two most significant horizontal address bits $X_9$ and $X_8$ is 1. If during the address modification in case of $Y_9=1$ the value of the addresses $X_8$ and $X_9$ is changed to 1, then the so obtained addresses will define the last four horizontal regions of the memory when the electron beam scans the fields A, B and C in the nineth line of regions.

It is characteristic to the field A that during its existence the values of the horizontal address bits $X_8$ and $X_9$ are both 0. From this follows that with the above modification of the horizontal addresses the field A is transformed to the field A' in FIG. 4 ($Y_9$ does not address the memory).

During the scanning of the field B provision should be made that the modified addresses define the field B' in FIG. 4. In FIG. 3 it can be seen that in the field B the value of the horizontal address $X_8$ is 1. In FIG. 4, however, the modified field B' has a vertical address in which $Y_6=1$. The address modifying circuit of FIG. 5 satisfies this condition by providing the equation $X_8=Y'_6$ if $Y_9=1$.

Similarly, when the field C is scanned by the electron beam, the modified address should define the field C'. It is true for the field C that $X_9=1$ (FIG. 3). In the field C' the condition $Y_7=1$ should be met. The circuit of FIG. 5 provides for such conditions.

The address modifying circuit does not change the least significant six horizontal and vertical addresses $X_o$, $X_1$, $X_2$, $X_3$, $X_4$, $X_5$ and $Y_o$, $Y_1$, $Y_2$, $Y_3$, $Y_4$, $Y_5$ which within the respective elementary regions define memory locations associated with respective raster points. The address modification does not affect the addresses $X_6$, $X_7$ and $X_8$ either.

The modified addresses are summarized in the following table 1. The addresses marked by the prime "'" represent the modified ones.

TABLE 1

| Picture address | modified address | condition |
|---|---|---|
| $X_8$ = | $X'_8$ | $Y_9 = 0$ |
| $X_9$ = | $X'_9$ | |
| $Y_6$ = | $Y'_6$ | |
| $Y_7$ = | $Y'_7$ | |
| 1 = | $X'_8$ | $Y_9 = 1$ |
| 1 = | $X'_9$ | |
| $X_8$ = | $Y'_6$ | |
| $X_9$ = | $Y'_7$ | |

The multiplexer 100 shown in FIG. 5, which can be implemented e.g. by the integrated circuit SN 74157 of Texas Instruments Inc., can be replaced by any other logical circuit that is capable of satisfying the criteria set by table 1.

When the address modifying circuit is used, the most significant vertical address $Y_9$ is not transmitted for further utilization, since the role of this address bit lies only in the appropriate control of the address modifying process. This explains why only nineteen addresses should be associated with actual memory address ports of the complete number of twenty picture addresses. With the twenty picture addresses the operations and the programming remain easy to handle and visualize, and the address modification spares half of the required storage capacity.

Figure 6:
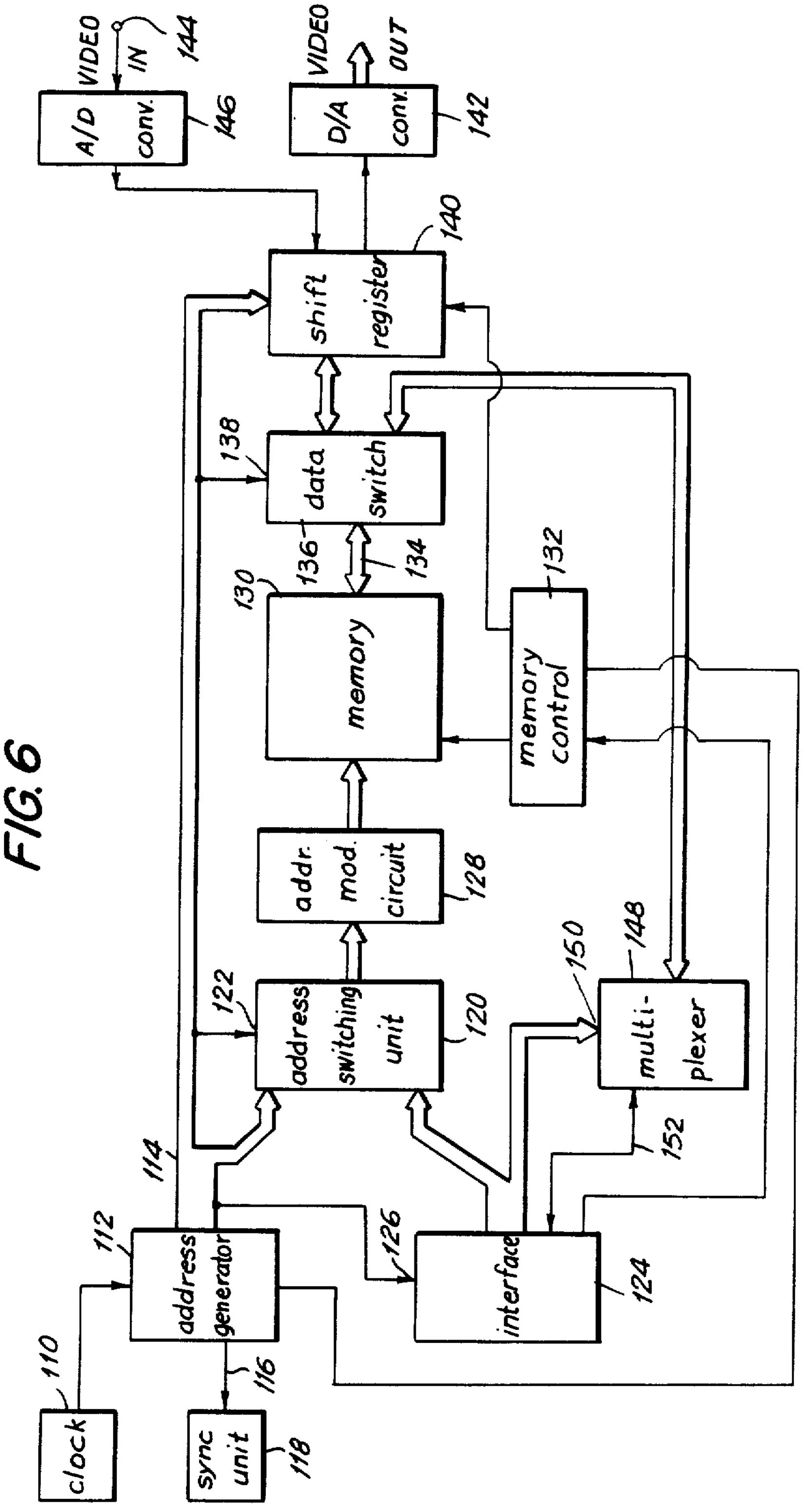
FIG. 6 shows the general block diagram of the invention.

FIG. 6 shows the general block diagram of the apparatus according to the invention. The apparatus comprises a central clock generator 110 providing clock pulses with a repetition frequency of about 15 MHz and an address generator 112 which in response to the clock pulses provides horizontal and vertical addresses required for addressing the memory. The output of the address generator 112 is coupled to address bus 114 which comprises the address lines of the horizontal and vertical addresses $X_o$, $X_1$, . . . $X_9$ and $Y_o$, $Y_1$, $Y_2$ . . . $Y_9$ described in connection with FIGS. 1 to 4. The address generator 112 has a synchronizing output 116 which controls a synchronizing unit 118. The synchronizing unit 118 generates synchron pulses for a television monitor not shown in FIG. 6 and the pulses are phase-locked to the picture addresses and are combined with video output signals provided by the apparatus to form a standard compound video signal sequence.

The address bus 114 of the address generator 112 is coupled to first inputs of an address switching unit 120. The output of the address switching unit 120, depending on the logical value of the control signal coupled to its control input 122, provides the logical values of the signals lead either of its first or second inputs. The second inputs of the address switching unit 120 are connected to the address outputs of interface 124 providing connection to an outer computer or terminal not shown in the drawing. It will be explained later that the display monitor and the computer alternatively get access to memory 130 of the apparatus. The way of addressing the memory 130 is identical in case of both kinds of accesses. The addresses of the displayed raster points are always determined by the condition of the address bus 114 of the address generator 112. The memory access initiated by the outer computer is determined by the address sent from the computer via the interface 124. For the sake of distinguishing the addresses arriving from the computer and the normal picture addresses, the horizontal and vertical computer addresses will be designated as $AX_o$, $AX_1$, $AX_2$ . . . $AX_9$ and $AY_o$, $AY_1$, $AY_2$ . . . $AY_9$.

The computer has access to the memory in predetermined operational phases only, which is provided by interconnecting the address access enable input 126 of the interface 124 with one of the address lines e.g. with the horizontal address line $X_3$ of the address generator 112.

The output of the address switching unit 120 is coupled through the address modifying circuit 128 to the address inputs of memory 130. The address modifying circuit 128 is substantially identical with that shown in FIG. 5 and it provides an appropriate address control for the memory 130 which is in accordance with the aforementioned conditions. The memory 130 is coupled to a memory control unit 132 which latter is connected both to the address generator 112 and the interface 124 and it controls the memory 130 in appropriate modes of operation (writing, reading modes). A data bus 134 is associated with the memory 130 for transmitting both output and input data and the data bus 134 is coupled to the input of a data switching unit 136. The data switching unit 136 regarding its design and control is similar to the address switching unit, and it has the task of alternatively switching the data bus 134 either to the computer or to the display monitor. The data switching unit 136 has a control input 138 controlled by the appropriate address line (the horizontal address line $X_3$) of the address bus 114. In the operational mode in which the data switching unit 136 is associated with the television monitor, the unit 136 is directly coupled to a transition memory which can be implemented by a shift register 140 in the exemplary ambodiment, and the shift register 140 is controlled from the least significant horizontal address lines ($X_o$, $X_1$, $X_2$ and $X_3$) and it performs a parallel to serial conversion. The series output of the shift register 140 is coupled to D/A converter 142 which represents at its analog output the read out memory values in the form of an analog voltage.

The apparatus shown in FIG. 6 facilitates the reading of outer video signals in the memory 130. In this case appropriate circuits (not shown in the drawing) provide that the video signals which are to be recorded arrive synchronously with respect to the horizontal and vertical addresses of the apparatus. From the analog signals arriving in video input 144 an A/D converter 146 provides digital signals coupled to the series input of the shift register 140. The writing mode is set by the computer through the interface 124 and by the memory control unit 132, and in that case data entered in series in the shift register 140 can be written through the data switching unit 136 in parallel in the memory 130 receiving then a writing enable signal.

During computer access periods the other output group of the data switching unit 136 acts as if it were an extension of the data bus 134. This output group consists of a plurality of parallel bit lines coupled respectively to corresponding inputs of multiplexer 148. The multiplexer 148 has a state control input 150 and the logical condition of the latter selects the input which is coupled to data line 152 of the interface 124. The above described connection between the data line 152 and the data bus 134 provides for a bidirectional data-movement, whereby the computer will be capable of writing in and reading out from the memory 130.

The apparatus shown in FIG. 6 can store six bits of information at each address. This means that the memory is composed of six memory units controlled in parallel, and the units coupled to the data bus 134 can transmit signals corresponding to the six bit long output information. From the six bit long information content the D/A converter 142 can produce $2^6=64$ steps of gradation, or if color display is used 64 different colors can be displayed on the screen of the monitor. In the latter case a standard Red, Green, Blue signal should be generated from the output signal of the D/A converter 142.

The operation of the apparatus shown in FIG. 6 is as follows.

With the conditions described in connection with FIGS. 1 to 4 during the scanning of each television raster line 768 raster points can be displayed (when the higher dissolution is used). If the visible section of a raster line is regarded, the duration of a raster point will be about 66 ns. The period time of the clock pulses of the clock generator 110 is about 66 ns, and the address generator 112 provides the vertical and horizontal addresses from these clock pulses. The horizontal addresses are obtained by appropriate divisions of the clock pulses according to subsequent integer powers of two, and the period time of the horizontal address $X_o$ is equal to that of the clock pulses.

For the understanding of the memory addressing, also the actual access times of existing memories should be regarded. In the following paragraphs the specific properties of random access dynamic memories will be described, since these properties form conditions for the realization with regard to the design of the addressing system.

In dynamic RAM memories the storage elements are respective capacitors. The losses of such capacitors should be compensated frequently at least following every period of 2 ms duration. This operation is referred to as refreshment. If no refreshment occurs with a 2 ms long period, the stored information gets lost.

The addressing system is designed in such a way that the first half of the addressing bits are enabled by a Row Address Strobe signal, in short by a RAS signal, and the second half is enabled by a Column Address Strobe signal i.e. CAS signal. It is sufficient for the refreshment that the first half of the address bits is used for either writing or reading operations within repetitive periods shorter than 2 ms.

The number of address ports of dynamic RAM memories is half the number of bits required for their complete addressing. The complete addressing occurs in two consecutive moments. In the first step together with the establishment of the RAS signal e.g. the first group of seven address bits and in the second step together with the CAS signal the second group of seven address bits have to be coupled to the address ports. The writing enable signal can be established together with the generation of the CAS signal. Without the presence of a write enable signal, the reading mode is obtained. Following the establishment of an address the readout data will be available after a certain delay, and in writing mode data can be read in when a corresponding delay time has elapsed since the establishment of the address. This delay time takes an essential part from the full access time of the dynamic memory and typically it is between about 150 and 300 ns. The price of dynamic memories increases rapidly with the shortening of access time. It has been found that with the currently available integrated components the specific memory costs for a unity stored information are at minimum if dynamic memories with 16K×1 bit storage capacity are used, however, the usage of memories with 64K×1 bit capacities can also be preferable in the present invention without any substantial change in system design or way of control.

Reference is made again now to FIG. 6 and the operation will be described in the exemplary case when the memory 130 consists of several dynamic memories with 16K×1 bit storage capacity addressed all in parallel. For the addressing of a memory with such capacity 14 bits are required.

The output of the address generator 112 provides the horizontal addresses $X_o$, $X_1$, . . . $X_9$ and the vertical addresses $Y_o$, $Y_1$ . . . $Y_9$, altogether twenty addresses. Each address combination represents respective elementary raster points in the visible picture area, as it has been described in connection with FIGS. 1 and 2.

In connection with FIG. 5 it has been described that of the twenty input address lines the address modifying circuit 128 passes through only nineteen because as many bit lines are already sufficient for the addressing of the required number 768×576 of raster points.

The dynamic memory elements forming the memory 130 can be addressed in the exemplary case by 14 bits. The remaining five address lines cannot be used directly for the addressing of the memory. It can be understood, if the memory 130 is composed of $2^5=32$ memory elements and each has a storage capacity of 16K×1 bit, then the remaining five bit should serve for the selection of the required memory element.

Let us examine what kind of memory organization can provide that the reading of the memory towards the display monitor should occur synchronously with the scanning electron beam, that the memory elements should obtain refreshment within the required maximum 2 ms long periods and in the meantime the computer should have a free access to all of the memory locations.

Figure 7:
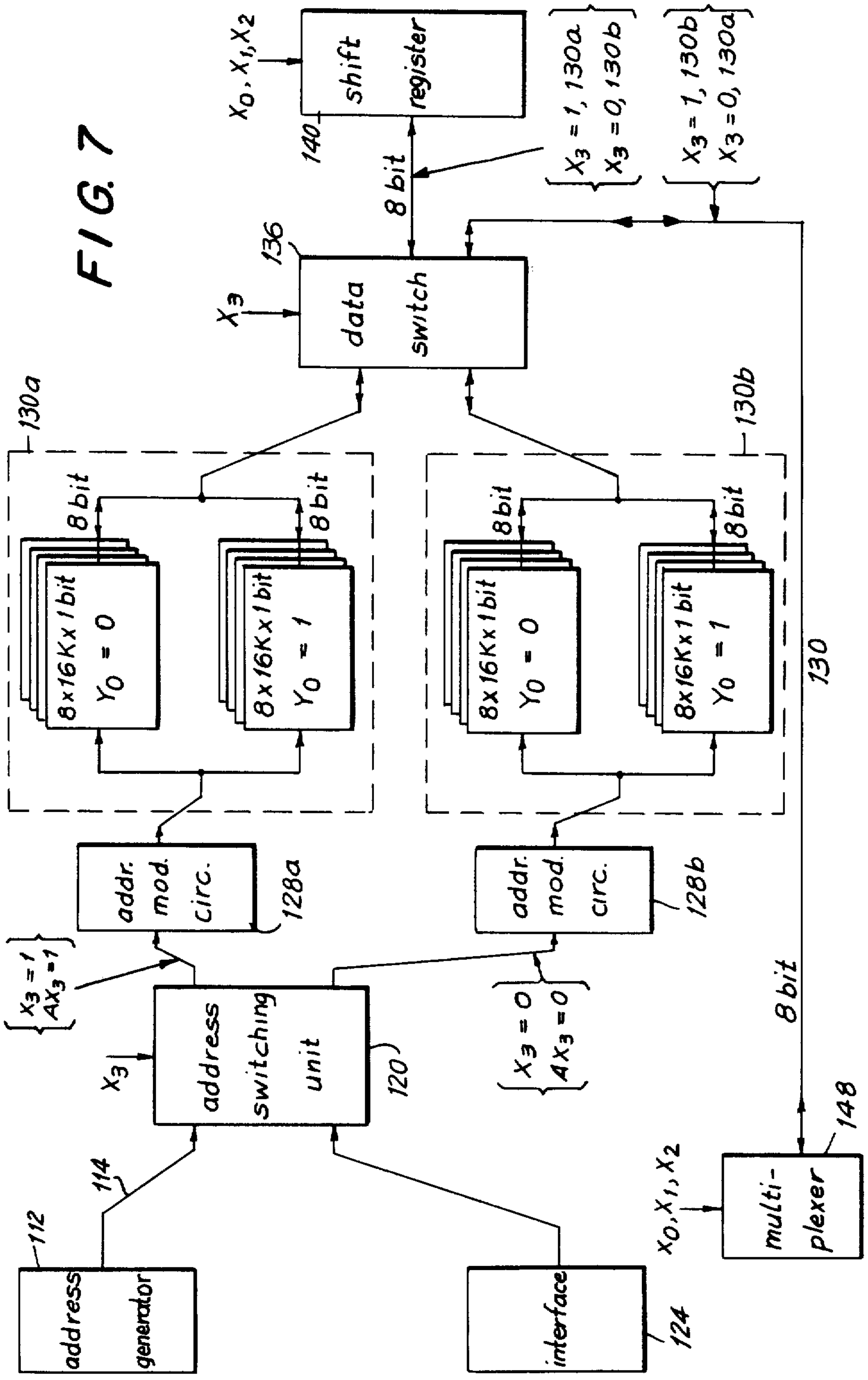
FIG. 7 shows a preferable embodiment of the memory organization of the apparatus shown in FIG. 6.

For the illustration of the circuit design of the memory 130 FIG. 7 shows the units coupled directly to the memory 130, and the groups organized by the individual memory elements have also been illustrated. The following explanation supposes that in each raster point a single bit is stored only. Obviously, if more information have to be stored associated with respective raster points, this demand can be satisfied by a simple multiplication of the memory elements.

FIG. 7 shows that the memory elements of the memory 130 are grouped in two blocks 130*a*, 130*b* and each block comprises a pair of groups of memory elements each group comprising eight elements.

It follows from the principle of the standard television scanning with alternating half-pictures, that two adjacent lines which are neighbours on the visible picture are associated with separate half-pictures following each other. The duration of each half-picture is 20 ms. When this is compared to the vertical addresses shown in FIGS. 1 and 2 it can be seen, that the 0 values of the vertical address $Y_o$ define the first half-pictures and the 1 values thereof define the second half-pictures. Within the respective memory blocks 130*a* and 130*b* a group of eight memory elements is associated with the value $Y_o=0$ and another group with $Y_o=1$. The memory control unit 132 illustrated in FIG. 6 is organized in such a way that depending on the value of $Y_o$ it enables either of the two groups. Within the respective blocks the sixteen memory elements are connected in parallel.

Since the address $Y_o$ has been used for the selection of the required group of memory elements, there are only four further addresses which have to be allocated, because the respective memory elements can be addressed by fourteen bits.

The difference between the respective blocks 130*a* and 130*b* lies in that the block 130*a* stores the information associated with the raster points having a horizontal address $X_3=1$, while the other block 130*b* stores information for the points having horizontal addresses with $X_3=0$. When the addressing is considered the blocks 130*a* and 130*b* can be regarded as being addressed in parallel, however, actually the address switching unit 120 and the data switching unit 136 connect the respective blocks alternatively to the television monitor or to the interface 124 coupled to the computer.

FIG. 7 shows that in case of $X_3=1$ the address switching unit 120 connects the address generator 112 through the address modifying circuit 128*a* to the address lines of the upper block 130*a*. In that case eight memory elements are read out in parallel from the block 130*a* and the readout data are written in eight parallel locations of the shift register 140 through the data switching unit 136.

Substantially at the same time the interface 124 clocks the addresses $AX_3=0$ towards the computer, and the address switching unit 120 passes the address lines coming from the interface 124 through the address modifying circuit 128*b* to the memory elements of the lower block 130*b*. The data lines of the memory elements of the block 130*b* are switched by the data switching unit 136 towards the multiplexer 148 also at the same time.

When the value of $X_3$ is changed to 0, then the functional roles will be interchanged i.e. the address and data lines of the upper block 130*a* will be switched towards the interface 124 and the lower memory block 130*b* will communicate with the monitor.

The blocks are therefore alternatively coupled either to the computer or to the monitor depending on the state of $X_3$ and during each of such connections an information reading or writing operation takes place that corresponds to the passage of 8 bits of information.

Obviously, the above described alternative switching of the blocks can be spared if the individual blocks comprise sixteen parallel memory elements which are distinguished according to the value of $Y_o$. In such cases, however, the simultaneous switching and transfer of sixteen bits is required, and the handling and matching of buses with high bit-number is not favourable regarding the costs.

Remaining with the exemplary embodiment shown in FIG. 7 it can be seen that during each value of FIG. 3 respective groups of 8 bits length will be available at the parallel inputs of the shift register 140. It follows from the addressing system that each period of $X_3$ comprises 8 full periods of $X_o$. When the shift register 140 is clocked by pulses having a frequency of $2X_o$ (with period times of approximately 66 ns), the information written in parallel in the shift register 140 will be shifted to D/A converter 142 (FIG. 6) and the monitor obtains fresh information in every 66 ns. Instead of the shift register 140 a multiplexer with eight inputs and an output can also be used if it is set by the addresses $X_o$, $X_1$ and $X_2$. Of the aforementioned remaining four address bits the control of the selection between the blocks has taken one i.e. the bit of $X_3$, and the still remaining three address bits are used for the control of the parallel to series conversion carried out by the shift register 140 or by the multiplexer not shown in the drawing. In view of the fact that the blocks are alternatively connected towards the shift register 140, respective blocks can be accessed from the computer side in each half-period of $X_3$.

Obviously, if the memory 130 is designed to have a larger storage capacity and more than 14 bits can be used for determining its address, then the problem of memory allocation will be less complicated, since a fewer number of address bits will have to be used for the parallel to series conversion i.e. the length of the shift register can be reduced.

A substantially equivalent alternative is obtained if smaller picture dissolution is sufficient. With half as fine dissolution in both directions, the configuration shown in FIG. 7 can be modified inasmuch, as there will be no need for the repetition of the memory elements in the memory blocks according to the value of $Y_o$ because both half pictures will then comprise identical information and also the frequency of the clock pulses can be reduced to the half of the value used with the high dissolution. By such modifications it is sufficient if respective four bits are transmitted in parallel from and to the memory instead of the eight bits of the previous embodiment. With such dissolution the required full memory capacity is therefore a quarter of the value required for the higher dissolution.

The continuous refreshment of the dynamic memory elements can be provided by the rational allocation of the 14 memory address bits. It should be beared in mind that each address clocked together with the RAS signal must occur within repetition periods shorter than 2 ms. Of the horizontal addresses the addresses $X_o$, $X_1$, $X_2$ and $X_3$ are not used for the direct addressing of the memory elements. The remaining addresses are changing in every line, and due to the allocation of the modified memory addresses shown in FIGS. 4 and 5 in the lines associated with the vertical addresses $Y_9=0$ not every value of the horizontal address $X_9$ is utilized and the usage of the horizontal address $X_8$ is also not preferable for the memory refreshment, since only those addresses can be used for the refreshment task that occur in shorter periods than 2 ms. A preferable allocation of the actual memory addresses is given below for memory elements of $16K\times1$ bits capacity. The memory addresses established together with RAS signals are: $X_4$, $X_5$, $X_6$, $X_7$ and $Y_1$, $Y_2$, $Y_3$. Of these addresses the horizontal ones take every possible combination in every television line, and the slowest vertical address $Y_3$ occurs at least in every eighth television line, i.e. having an occurrence rate of 512 $\mu$s. With such addresses the requirements for the refreshment of the memory are satisfied well within the maximum permitted periods of 2 milliseconds.

The memory addresses established together with the CAS signals are: $X_8$, $X_9$ and $Y_4$, $Y_5$, $Y_6$, $Y_7$ and $Y_8$. Of the remaining addresses:

- $Y_9$ is used for the address modifying circuit 128;
- $Y_o$ is used for the validation of the groups of the blocks 130*a* and 130*b* (according to the changes of the half pictures);
- $X_o$, $X_1$ and $X_2$ are used for controlling the parallel to series conversion; and
- $X_3$ is used first to control the selection between the memory blocks and on the other hand to control the alternating access to the memory either for the computer or for the display monitor.

It can also be preferable, if unlike to the organization shown in FIGS. 6 and 7, the memory blocks 130*a* and 130*b* are divided in two parts, respectively, in such a way, that respective groups of four memory elements are controlled in parallel. If the switching of the addresses and the data between the groups is carried out by means of the occurrence of the address $X_2$, then the length of the parallel to series conversion can be reduced to two bits i.e. the shift register might comprise four locations only. In that case, however, the memory cycles of the memory groups controlled according to different values of the address $X_2$ should be offset in time with one cycle with respect to each other to provide sufficient time therebetween for the undisturbed access towards the computer. The advantage of such an organization lies in that data lines carrying four bits can be used instead of the data lines of eight bits required in the organization according to FIGS. 6 and 7; which involves substantial reduction of hardware costs.

It will be clear from the above description that the individual skilled in the art can devise further embodiments not described herein without departing from the scope and spirit of the present invention and the invention cannot be limited to the exemplary embodiments explained for the clear understanding only.

We claim:

1. An apparatus for the display and storage of television picture information by using a dynamic random access memory accessible from a computer, comprising a clock generator, an address generator coupled to the clock generator for generating horizontal and vertical picture addresses ($X_o$-$X_9$, $Y_o$-$Y_9$), a synchronizing unit connected to the address generator and providing line and picture synchronizing signals, an interface connected to the computer, a memory control unit, coupled to the address generator, the memory, and to the interface for controlling the memory, an address switching unit including a first input group connected to predetermined address lines of the address generator and a second input group connected to predetermined address lines of the interface, a pair of address modifying circuits with respective inputs coupled to a respective output group of the address switching unit and outputs coupled to address ports of the memory to provide modified addresses for the memory when any of the input groups addresses the memory, in which between the inputs and the outputs the following logical equations are true:

$$X_8=X'_8;\ X_9=X'_9;\ Y_6=Y'_6;\ Y_7=Y'_7 \text{ if } Y_9=0$$

and $$1=X'_8;\ 1=X'_9;\ X_8=Y'_6;\ X_9=Y'_7 \text{ if } Y_9=1,$$

in which addresses designated by X and Y represent states of corresponding horizontal and vertical bit lines of the address generator, addresses X' and Y' designate the states of the modified horizontal and vertical address lines at the output of the address modifying circuit, a data switching unit including a first and a second output group, the input of the data switching unit being connected to a data bus of the memory, a parallel to series converter with parallel ports coupled to the address generator and the first output group of the data switching unit and controlled by predetermined address lines of the address generator carrying the least significant horizontal address bits ($X_o$-$X_2$) to step the parallel data in sequence with least significant horizontal address bit ($X_o$) from or to the series port thereof, said series port connected to a digital to analog converter which converts and supplies said serially stepped bits as a video signal and to digital outputs of an analog to digital converter for transferring a digitized video signal from said analog to digital converter to the memory, the second output group of the data switching unit coupled to a data bus of said interface for transferring data between the memory and the interface, control inputs of the address switching unit and of the data switching unit being connected to horizontal address bit ($X_3$), said memory including matrices whose rows are to be accessed by row addresses for reading or writing within a time period less than that required for refresh of said memory, and said modified addresses specifying rows addressed by row and column addresses of the matrices such that the row addresses ($X_4$, $X_5$, $X_6$, $X_7$, $Y_1$, $Y_2$, $Y_o$) are updated in shorter consecutive periods than the time required for refresh of said memory, one of two sets of said matrices being addressed via a first one of said address modifying circuits by addresses generated from said address generator, the data lines of said set being coupled through said data switching unit with said converter, while the other set is addressed via the other one of said address modifying circuits by addresses generated from the computer and sent via said interface, the data lines of said other set coupled through said data switching unit with said interface, whereby the respective connections established to said sets through said switching units alternate according to the value of said control bit ($X_3$) alternating.

2. The apparatus as claimed in claim 1, wherein each set of the matrices includes a pair of groups of matrices, each group storing a respective half picture, a first one of said groups is enabled by the $Y_o=1$ condition, while the other one of said groups enabled by the $Y_o=0$ condition, in which $Y_o$ represents the least significant vertical address bit.

* * * * *

UNITED STATES PATENT AND TRADEMARK OFFICE

CERTIFICATE OF CORRECTION

PATENT NO. : 4,675,842

DATED : June 23, 1987

INVENTOR(S) : Zsuzsa Szenes et al

It is certified that error appears in the above-identified patent and that said Letters Patent is hereby corrected as shown below:

[75] Inventors: Zsuzsa Szenes, Bèla Endrődi, both of Budapest, Hungary

Signed and Sealed this

Tenth Day of November, 1987

*Attest:*

DONALD J. QUIGG

*Attesting Officer*

*Commissioner of Patents and Trademarks*